United States Patent
Ganesh

(10) Patent No.: US 10,331,786 B2
(45) Date of Patent: Jun. 25, 2019

(54) DEVICE COMPATIBILITY MANAGEMENT

(71) Applicant: Google LLC, Mountain View, CA (US)

(72) Inventor: Jaikumar Ganesh, San Francisco, CA (US)

(73) Assignee: Google LLC, Mountain View, CA (US)

( * ) Notice: Subject to any disclaimer, the term of this patent is extended or adjusted under 35 U.S.C. 154(b) by 1175 days.

(21) Appl. No.: 13/969,662

(22) Filed: Aug. 19, 2013

(65) Prior Publication Data

US 2015/0052238 A1 Feb. 19, 2015

(51) Int. Cl.
| | | |
|---|---|---|
| *G06F 15/16* | (2006.01) | |
| *G06F 17/27* | (2006.01) | |
| *H04L 29/08* | (2006.01) | |
| *G06F 11/07* | (2006.01) | |
| *H04L 12/24* | (2006.01) | |

(52) U.S. Cl.
CPC ...... *G06F 17/2785* (2013.01); *G06F 11/0709* (2013.01); *G06F 11/0751* (2013.01); *H04L 29/08072* (2013.01); *H04L 69/329* (2013.01); *H04L 41/147* (2013.01)

(58) Field of Classification Search
CPC .. H04L 29/08072; H04L 29/06; H04L 41/147
USPC .......... 709/203, 220, 224, 229, 227
See application file for complete search history.

(56) References Cited

U.S. PATENT DOCUMENTS

| | | | |
|---|---|---|---|
| 5,974,412 A | 10/1999 | Hazlehurst et al. | |
| 6,393,490 B1 | 5/2002 | Stiles et al. | |
| 7,802,200 B1 | 9/2010 | Siegel et al. | |
| 8,041,669 B2 | 10/2011 | Nigam et al. | |
| 8,194,986 B2 * | 6/2012 | Conwell | G06F 17/30265 382/224 |
| 8,503,791 B2 * | 8/2013 | Conwell | G06F 17/30265 382/190 |
| 8,520,979 B2 * | 8/2013 | Conwell | G06F 17/30265 382/219 |
| 8,606,021 B2 * | 12/2013 | Conwell | G06F 17/30265 382/224 |
| 8,755,837 B2 * | 6/2014 | Rhoads | G06K 9/6253 455/556.1 |

(Continued)

OTHER PUBLICATIONS

International Search Report and Written Opinion, dated Jun. 3, 2015 in corresponding International Application No. PCT/US2014/051487.

*Primary Examiner* — Khanh Q Dinh
(74) *Attorney, Agent, or Firm* — McDonnell Boehnen Hulbert & Berghoff LLP

(57) ABSTRACT

Methods and systems for automatically providing a notification of an operational problem between two devices are provided. The method may include searching online content for user feedback comments associated with a first device and a second device. Sentiment analysis may be performed for the user feedback comments and an operational problem that occurs between the first device and the second device may be identified based on the sentiment analysis. Next, a notification of the operational problem may be provided. Additionally, a probable cause associated with the operational problem may be identified and a suggested solution based on the identified probable cause may be provided. The suggested solution may correct the operational problem between the first device and the second device.

35 Claims, 2 Drawing Sheets

(56) References Cited

U.S. PATENT DOCUMENTS

| | | | |
|---|---|---|---|
| 8,805,110 B2* | 8/2014 | Rhoads | G06F 17/30241 |
| | | | 382/255 |
| 8,819,013 B2* | 8/2014 | Buryak | G06F 17/30598 |
| | | | 707/732 |
| 8,873,853 B2* | 10/2014 | Rodriguez | G06F 17/30265 |
| | | | 382/162 |
| 9,197,736 B2* | 11/2015 | Davis | G06F 3/04842 |
| 2005/0125390 A1 | 6/2005 | Hurst-Hiller et al. | |
| 2008/0147789 A1 | 6/2008 | Wing et al. | |
| 2009/0281870 A1 | 11/2009 | Sun et al. | |
| 2009/0282019 A1 | 11/2009 | Galitsky et al. | |
| 2010/0048242 A1* | 2/2010 | Rhoads | G06F 17/30244 |
| | | | 455/556.1 |
| 2010/0106542 A1 | 4/2010 | Green et al. | |
| 2010/0153861 A1* | 6/2010 | Henshaw | G06Q 10/02 |
| | | | 715/758 |
| 2013/0035983 A1 | 2/2013 | Kursar et al. | |
| 2013/0063613 A1* | 3/2013 | Conwell | G06F 17/30265 |
| | | | 348/207.99 |
| 2013/0246463 A1* | 9/2013 | Trim | H04L 41/147 |
| | | | 707/776 |
| 2013/0273968 A1* | 10/2013 | Rhoads | G06K 9/6253 |
| | | | 455/556.1 |
| 2015/0032492 A1* | 1/2015 | Ting | G06Q 50/01 |
| | | | 705/7.14 |
| 2015/0032751 A1* | 1/2015 | Ting | G06F 16/285 |
| | | | 707/738 |

* cited by examiner

DEVICE COMPATIBILITY MANAGEMENT

BACKGROUND

Currently there are hundreds of models of various device-types on the market, such as mobile phones, tablets, laptops, wearable computers, headsets, earpieces, in-car audio units, home audio systems, biometric devices, and the like. Many of these devices-types can be used to communicate with other device-types, for example a mobile phone can be used with a headset, a mobile phone can stream content to an in-car audio unit, a wearable computer can provide data to a biometric device, and the like. However, compatibility between these various device-types can be difficult to achieve and manage. For example, a mobile device model 1.0 made by manufacturer A may be compatible with headset model 2.0 made by manufacturer B. On the other hand, the same mobile device model 1.0 made by manufacturer A may not be compatible with headset model 3.0 made by manufacturer C. It can be difficult for various device manufacturers and users to become aware of compatibility issues between two particular devices. Furthermore, because of the number of device models and device-types released into the market each year, it can be difficult to remain up to date on compatibility issues between new models of devices and various device-types.

BRIEF SUMMARY

According to an embodiment of the disclosed subject matter, a method includes searching online content for a plurality of user feedback comments associated with a first device and a second device. Performing sentiment analysis for each user feedback comment from among the plurality of user feedback comments. Next, an operational problem that occurs between the first device and the second device based on the sentiment analysis may be identified, and a notification of the operational problem may be provided.

An implementation of the disclosed subject matter provides a system that includes a processor configured to search online content for a plurality of user feedback comments associated with a first device and a second device. Sentiment analysis may be performed for each user feedback comment from among the plurality of user feedback comments. Next, an operational problem that occurs between the first device and the second device based on the sentiment analysis may be identified, and a notification of the operational problem may be provided.

An implementation of the disclosed subject matter provides a computer readable medium storing a plurality of instructions that cause a processor to search online content for a plurality of user feedback comments associated with a first device and a second device. The processor may perform sentiment analysis for each user feedback comment from among the plurality of user feedback comments. Next, an operational problem that occurs between the first device and the second device based on the sentiment analysis may be identified, and a notification of the operational problem may be provided.

Implementations of the disclosed subject matter may provide improved monitoring of compatibility between various devices, as well as easier management of device operational issues across the market. The disclosed subject matter identifies an operational problem between a first device and a second device and provides a notification of the operational problem, for example, to a device manufacturer and/or a user. This notification may result in more focused testing and problem solving by device manufacturers, which may result in improved device compatibility and increased user satisfaction. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
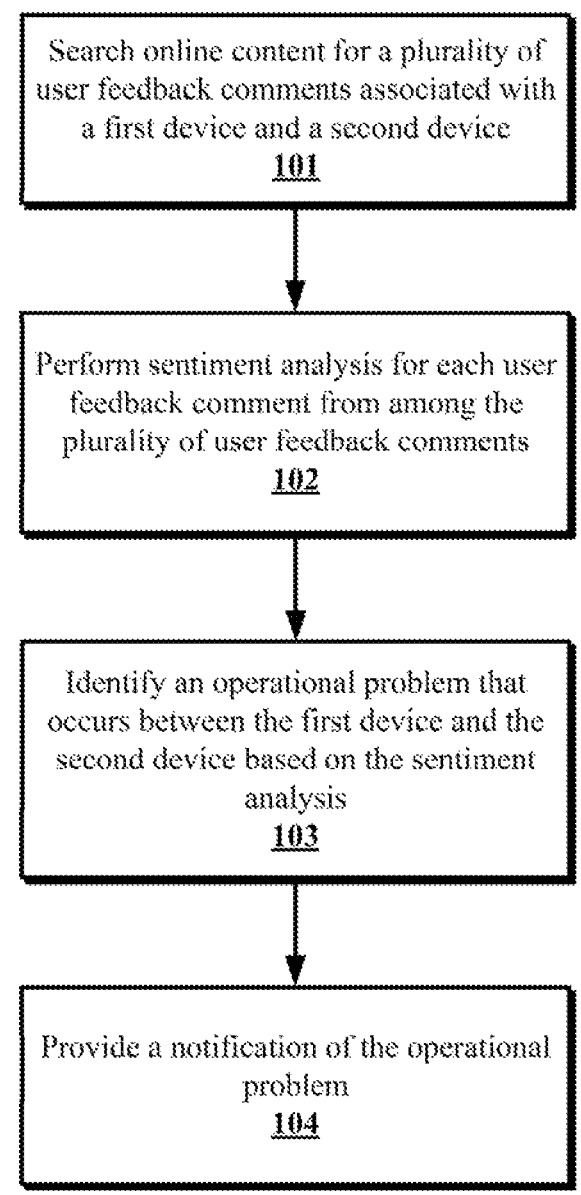
FIG. 1 shows an example process according to an implementation of the disclosed subject matter.

In general, given the expanding market for device-types and device models, it can be challenging to monitor compatibility issues between device-types and device models as well as manage and/or solve operational problems between two devices. Currently, there is no efficient way to know if, for example, a particular headset does not work with a particular mobile device. In particular, device manufactures typically have research and development laboratories in which they test and study compatibility between devices and identify operability problems. This research effort may require the manufacturers to test hundreds of combinations of devices, with no knowledge of or focus on particular combinations of devices currently experiencing operational problems. Additionally, device manufacturers may attend interoperability events where multiple manufacturers meet to test compatibility of various devices and models. Thus, it may be advantageous to identify compatibility/operational problems that particular devices are experiencing.

Users of multiple devices may provide feedback and comments on online forums about the compatibility and/or problems between two particular devices. This user feedback may be used to help identify operational problems between the two devices. As such, the present disclosure provides methods and systems for identifying operational problems between two devices based on user feedback comments associated with the two devices.

Sentiment analysis, which is a subset of natural language processing, may be performed on user feedback comments, found by searching online content, to identify problems between two particular devices.

For example, when a user purchases a phone made by company A and a headset made by company B, the user may leave a comment on his blog post or on a social network. The comment may be about the user's experience with the phone and headset. Sentiment analysis may be used to parse the user's comment and determine if the sentence has a positive or a negative correlation. The positive and negative correlations are stored and subsequently analyzed. The subsequent analysis may identify operational problems between the particular headset and particular device. As a result, the device manufacturer, headset manufacturer, and/or the user may be notified of the operational problem. With this information, a manufacturer and/or a user may be able to take steps to solve the operational problem. For example, a manufacturer may be able to update software associated with the device or headset to correct the operational problem. In some instances, a user may be able to adjust a setting on his device to correct the operational problem. Furthermore, manufacturers may be able to focus their research on developing solutions to the identified operational problems, which may result in a cost reduction by avoiding the need to study every combination of device and headset. Moreover, such focused research and development may reduce the need to participate in interoperability events between manufacturers of devices and headsets.

More generally, an implementation of the disclosed subject matter provides a method for providing a notification of an operational problem between a first device and a second device, as shown in FIG. 1. A method includes searching online content for a plurality of user feedback comments associated with a first device and a second device, at 101. Online content may include a website, social media, a blog, a user review forum, and any other online content where user feedback comments associated with devices may be found. Sentiment analysis may be performed for each user feedback comment from among the plurality of user feedback comments, at 102. Next, at 103, an operational problem that occurs between the first device and the second device based on the sentiment analysis may be identified, and a notification of the operational problem may be provided, at 104.

Various device-types and models of these device-types are released into the market each year. A device may be manufactured by a specific manufacturer and there may be software associated with the operation of the device. As discussed above, a first device may be a headset, an earpiece, an in-car unit, an audio system, a wearable computer, a biometric device, and the like. A second device may be a mobile device, a smartphone, a laptop, a tablet, a PC, a wearable computer, an appliance, and any other device capable of connecting to a first device. A first device may be connected to a second device based on a variety of connection types such as a wire, near field communications, Bluetooth, Bluetooth LE, infrared, or other wireless connection protocol.

An implementation of the disclosed subject matter provides a system that includes a processor configured to search online content for a plurality of user feedback comments associated with a first device and a second device. Sentiment analysis may be performed for each user feedback comment from among the plurality of user feedback comments. Next, an operational problem that occurs between the first device and the second device based on the sentiment analysis may be identified, and a notification of the operational problem may be provided.

Sentiment analysis may refer to the application of natural language processing, computational linguistics, and/or text analytics to identify and extract subjective information in source materials, for example, text in a user feedback comment found in online content. In general, sentiment analysis aims to determine the attitude of a speaker or a writer with respect to some topic or the overall contextual polarity of analyzed text. The attitude may be his or her judgment or evaluation, affective state (e.g., the emotional state of the author when writing), and/or the intended emotional communication (e.g., the emotional effect the author wishes to have on the reader). In an implementation, sentiment analysis may parse text in a user feedback comment and determine if the comment has a positive or a negative connotation. For example, sentiment analysis may build a relationship based on a user feedback comment as follows: Bluetooth headset 3.0→Smartphone 5→positive→compatible. Similarly for a problematic first and second device combination, sentiment analysis may build a relationship as follows: Bluetooth headset 2.0→Smartphone 4→negative→call audio drops. As a result, the system may identify an operational problem, such as a connection problem, and make a determination that Bluetooth headset 2.0 and Smartphone 4 have a connection problem.

Additionally, an implementation of the disclosed subject matter provides a computer readable medium storing a plurality of instructions that cause a processor to search online content for a plurality of user feedback comments associated with a headset and a second device. The processor may perform sentiment analysis for each user feedback comment from among the plurality of user feedback comments. Next, an operational problem that occurs between the headset and the second device based on the sentiment analysis may be identified, and a notification of the operational problem may be provided.

As referenced above, an operational problem may be any problem that may occur between a first device and a second device. For example, an operational problem may be an audio problem, a connection problem, a communication problem, a syncing problem, and/or a recognition problem. An audio problem may be any problem that affects the audio, volume, sound, clarity, and the like while using two devices. A connection problem may be any interruption, break, disturbance, and the like, in the connection between the first device and the second device. A communication problem may be any pause, interruption, gap, and the like, in the communication between the first device and the second device. A syncing problem may be specific to a wireless connection between a first device and a second device, and may be any problem affecting the pairing protocol and/or synchronization of the wireless connection. A recognition problem may be any issue associated with recognition of a connection protocol, communication protocol, and the like, between a first device and a second device.

As discussed above, notification of an operational problem may be provided to a user and/or a device manufacturer. A notification may be an email, a text, a report, a message, an alert, an article, a website, input to social media, and any other form of communication for notifying a user and/or device manufacturer of an operational problem.

For example, a user may connect her Smartphone 2 to her Bluetooth Headset v.3 via a Bluetooth connection. At the same time, the Smartphone 2 may be connected to a Wi-Fi network. The user may provide feedback in an online forum indicating that the audio during a phone call fades in/out. It may be determined that there are audio and connection problems between the Smartphone 2 and Bluetooth Headset v.3. Accordingly, a notification of the audio and connection problems may be provided to users of the Smartphone 2 and Bluetooth Headset v.3 and/or manufacturers of the Smartphone 2 and Bluetooth Headset v.3.

The methods and systems described above may further include identifying a probable cause associated with the operational problem, discussed above. A probable cause may be any cause of an operational problem between two devices such as a hardware issue and/or a software issue. For example, a headset and a mobile device may be experiencing an audio problem where the sound on the headset is muffled. The muffled sound may be caused by a hardware issue associated with the headset.

In the example above regarding the Smartphone 2 and Bluetooth Headset v.3, a probable cause associated with the identified audio and connection problems may be identified. For example, streaming call audio from the Smartphone 2 to the Bluetooth Headset v.3 while connected to a Wi-Fi network may cause an overload on the Smartphone 2 if both connection types (Bluetooth and Wi-Fi) operate on the same frequency. The probable causes may be identified as being both a hardware issue and a software issue. The probable causes (hardware issue and software issue) of the audio and connection problems may be provided to manufacturers of the Smartphone 2 and Bluetooth Headset v.3.

The methods and systems described above may further include providing a suggested solution based on the identified probable cause, wherein the suggested solution corrects the operational problem between the two devices. For example, the suggested solution may be a hardware solution, a software solution, a first device setting solution, and/or a second device setting solution. In an embodiment, the probable cause may be a hardware issue and the suggested solution may be a software solution. For example, a headset and a mobile device may be experiencing an audio problem where the sound on the headset is muffled. The muffled sound may be caused by a hardware issue associated with the headset and the suggested solution may be a software solution such as amplifying the sound output by the mobile device.

In the same example above regarding the Smartphone 2 and Bluetooth Headset, a suggested solution may be provided based on the identified probable causes (hardware issue and software issue). In this case, a suggested solution to the overload on the Smartphone 2 caused by streaming call audio to the Bluetooth Headset v.3 while connected to a Wi-Fi network may be a software solution. For example, a suggested software solution may be to implement an information exchange schedule from the Smartphone 2 to the Bluetooth Headset v.3 and Wi-Fi network to avoid exchanging information with both simultaneously. This suggested software solution for the Smartphone 2 may be provided to the manufacturer of the Smartphone 2.

As another example, a user may provide feedback on a social media site indicating that his Smartphone 3 is able to successfully connect via Bluetooth to the in-car unit of his Model S car for phone functionality, but he is unable to use the media functionality on his in-car unit to control media from his Smartphone 3. Based on sentiment analysis of the user's feedback, it may be determined that the Smartphone 3 and the in-car unit of the Model S car are experiencing a connection problem. As a result, the Smartphone 3 manufacturer and/or the manufacturer of the in-car unit may be notified of the connection problem.

In connection with the above example, the probable cause of the connection problem may also be identified. For example, there are typically two types of profile connections made when connecting a smartphone with an in-car unit, a phone profile and a media profile. Generally, the phone profile is connected first and then the media profile is connected immediately thereafter. In the case of this connection problem between the Smartphone 3 and Model S car's in-car unit, wherein a connection for phone functionality is established but not for media functionality, a probable cause may be a hardware problem. For example, the Bluetooth chipset in the Smartphone 3 may not be able to connect to the phone profile first and then the media profile immediately thereafter. In this case, a suggested solution may be a software solution for the in-car unit of the Model S car. The suggested software solution may be to implement a time delay, for example 5 seconds, in connecting to the media profile after connecting to the phone profile. The manufacturer of the in-car unit of the Model S car may be notified of the hardware problem on the Smartphone 3 and may be provided with the suggested software solution. Additionally, users of the Smartphone 3 may be notified of the hardware issue.

According to an embodiment, multiple suggested solutions to operational problems and probable causes may be provided. For example, a user may make a comment on a social networking site indicating that when she is streaming music via Bluetooth from her Smartphone 5 to the in-car unit in her car and a call is received, the music is not paused while she is on her call. Based on the results of the sentiment analysis of her comment, it may be determined that the user is having a negative experience with the Smartphone 5 and the in-car unit. Additionally, it may be determined that the Smartphone 5 and the in-car unit are experiencing operational problems, specifically, audio and communication problems. Notification of the audio and communication problems may be provided to users of the Smartphone 5 and/or the in-car unit, as well as to manufacturers of the Smartphone 5 and the in-car unit. The probable cause of the audio and communication problems may also be identified. Typically, when a phone is streaming music via Bluetooth to an in-car unit and a call is received, the music is paused by the phone. Since the music is not being paused when a call is received, it may be determined that the probable cause is a software issue on the Smartphone 5. Additionally, proposed solutions to the software issue may be provided. One proposed solution may be a software solution for the in-car unit, which instructs the in-car unit to pause currently playing music upon receipt of a phone call. Another proposed solution may be a change to a setting on the in-car unit which a user may make, such as a setting to pause music upon receipt of a phone call. Yet another proposed solution may be a software solution for the Smartphone 5, such as a software update that causes streaming music to be paused on the phone upon receipt of a phone call when connected to an in-car unit via Bluetooth.

In some instances, the suggested solution may be deployed, thereby correcting the operational problem between the first device and the second device. The system may continue to monitor and analyze user feedback comments associated with the first device and second device. In particular, sentiment analysis may be used to determine that the operational problem between the first device and the second device has been corrected.

In situations in which the systems discussed here collect personal information about users, or may make use of personal information, the users may be provided with an opportunity to control whether programs or features collect user information (e.g., information about a user's device performance, device characteristics, user's social media input, device carrier, user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 2:
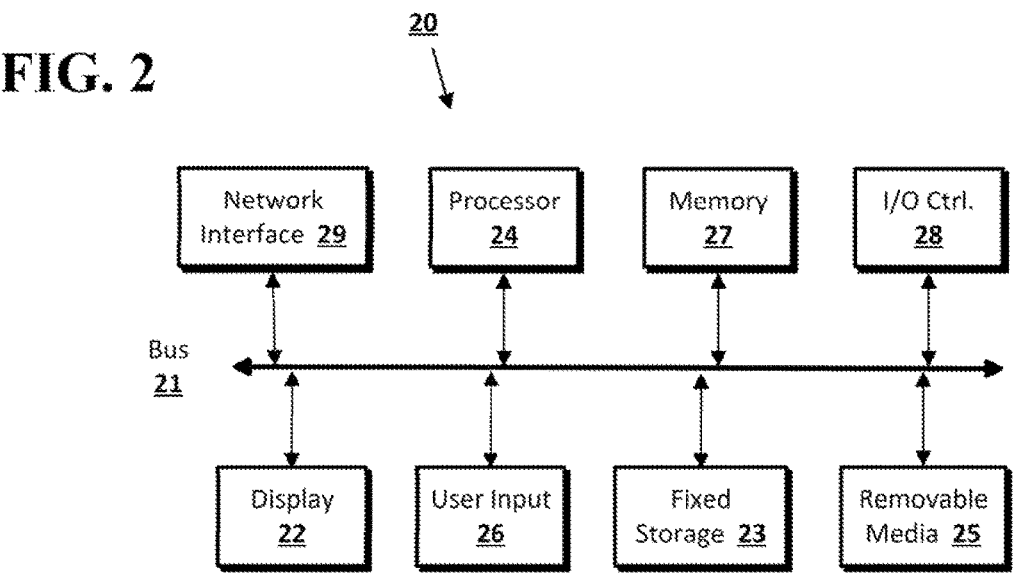
FIG. 2 shows a computer according to an embodiment of the disclosed subject matter.

Embodiments of the presently disclosed subject matter may be implemented in and used with a variety of component and network architectures. FIG. 2 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 3.

Many other devices or components (not shown) may be connected in a similar manner (e.g., document scanners, digital cameras and so on). Conversely, all of the components shown in FIG. 2 need not be present to practice the present disclosure. The components can be interconnected in different ways from that shown. The operation of a computer such as that shown in FIG. 2 is readily known in the art and is not discussed in detail in this application. Code to implement the present disclosure can be stored in computer-readable storage media such as one or more of the memory 27, fixed storage 23, removable media 25, or on a remote storage location.

Figure 3:
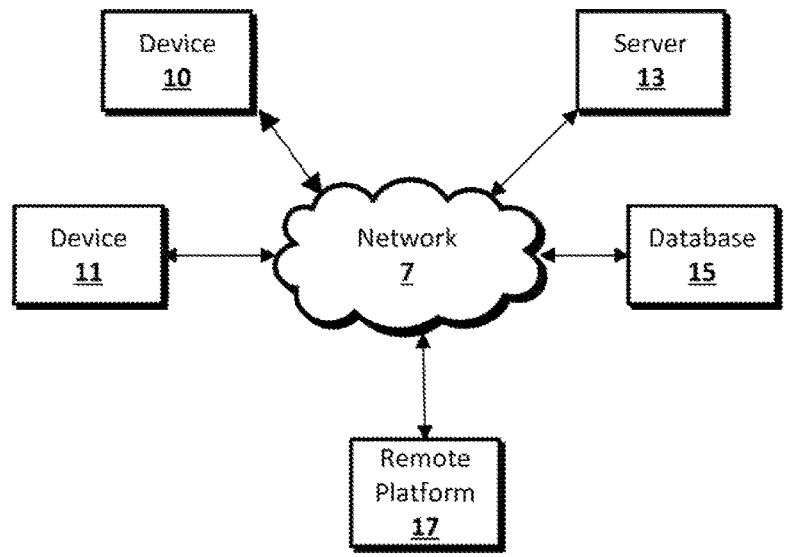
FIG. 3 shows a network configuration according to an embodiment of the disclosed subject matter.

FIG. 3 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
searching online content for a plurality of user comments associated with both a first device and a second device and related to compatibility between the first device and the second device;
performing sentiment analysis for each respective user comment from among the plurality of user comments, wherein the sentiment analysis includes parsing text in the respective user comment and determining whether the respective user comment has a positive connotation or a negative connotation based on text analytics, wherein the text analytics comprises extracting, from the text of the respective user comment, subjective information that indicates an emotional state of an author of the respective user comment;
identifying an operational problem that occurs between the first device and the second device based on determining a negative connotation in the sentiment analysis;
identifying at least one probable cause associated with the operational problem; and
providing (i) a notification of the operational problem and (ii) at least one suggested solution to the operational problem based on the at least one probable cause associated with the operational problem.

2. The method of claim 1, wherein the suggested solution corrects the operational problem between the first device and the second device.

3. The method of claim 1, wherein the second device is selected from the group consisting of a mobile device, smartphone, laptop, tablet, PC, wearable computer, appliance, and any other device capable of connecting to the first device.

4. The method of claim 1, wherein the second device is connected to the first device based on a connection selected from the group consisting of: a wire, near field communications, Bluetooth, Bluetooth LE, infrared, and other wireless connection protocol.

5. The method of claim 1, wherein the notification of the operational problem is provided to at least one selected from the group consisting of: a user, a first device manufacturer, and a second device manufacturer.

6. The method of claim 1, wherein the operational problem is at least one selected from the group consisting of: an audio problem, a connection problem, a communication problem, a syncing problem, and a recognition problem.

7. The method of claim 1, wherein the at least one probable cause is at least one selected from the group consisting of: a hardware issue and a software issue.

8. The method of claim 1, wherein the suggested solution is at least one selected from the group consisting of: a hardware solution, a software solution, a first device setting solution, and a second device setting solution.

9. The method of claim 1, wherein the at least one probable cause is a hardware issue and the at least one suggested solution is a software solution.

10. The method of claim 1, further comprising deploying the suggested solution correcting the operational problem between the first device and the second device and determining that the operational problem has been corrected based on sentiment analysis of a plurality of additional user comments.

11. The method of claim 1, wherein the operational problem is a compatibility issue that occurs between the first device and the second device.

12. The method of claim 1, wherein the online content includes one or more selected from the group consisting of: a website, a social media platform, a blog, a user review forum, and any other online content that can be searched for the plurality of user comments.

13. A system comprising:
a processor configured to:
search online content for a plurality of user comments associated with both a first device and a second device and related to compatibility between the first device and the second device;
perform sentiment analysis for each respective user comment from among the plurality of user comments, wherein the sentiment analysis includes parsing text in the respective user comment and determining whether the respective user comment has a positive connotation or a negative connotation based on text analytics, wherein the text analytics comprises extracting, from the text of the respective user comment, subjective information that indicates an emotional state of an author of the respective user comment;
identify an operational problem that occurs between the first device and the second device based on determining a negative connotation in the sentiment analysis;
identify at least one probable cause associated with the operational problem; and
provide (i) a notification of the operational problem and (ii) at least one suggested solution to the operational problem based on the at least one probable cause associated with the operational problem.

14. The system of claim 13, wherein the suggested solution corrects the operational problem between the first device and the second device.

15. The system of claim 13, wherein the second device is selected from the group consisting of a mobile device, smartphone, laptop, tablet, PC, wearable computer, appliance, and any other device capable of connecting to the first device.

16. The system of claim 13, wherein the second device is connected to the first device based on a connection selected from the group consisting of: a wire, near field communications, Bluetooth, Bluetooth LE, infrared, and other wireless connection protocol.

17. The system of claim 13, wherein the notification of the operational problem is provided to at least one selected from the group consisting of: a user, a first device manufacturer, and a second device manufacturer.

18. The system of claim 13, wherein the operational problem is at least one selected from the group consisting of: an audio problem, a connection problem, a communication problem, a syncing problem, and a recognition problem.

19. The system of claim 13, wherein the at least one probable cause is at least one selected from the group consisting of: a hardware issue and a software issue.

20. The system of claim 13, wherein the suggested solution is at least one selected from the group consisting of: a hardware solution, a software solution, a first device setting solution, and a second device setting solution.

21. The system of claim 13, wherein the processor is further configured to deploy the suggested solution correcting the operational problem between the first device and the second device and determine that the operational problem has been corrected based on sentiment analysis of a plurality of additional user comments.

22. The system of claim 13, wherein the at least one probable cause is a hardware issue and the at least one suggested solution is a software solution.

23. The system of claim 13, wherein the operational problem is a compatibility issue that occurs between the first device and the second device.

24. The system of claim 13, wherein the online content includes one or more selected from the group consisting of: a website, a social media platform, a blog, a user review forum, and any other online content that can be searched for the plurality of user comments.

25. A non-transitory computer readable medium storing a plurality of instructions that cause a processor to:
   search online content for a plurality of user comments associated with both a first device and a second device and related to compatibility between the first device and the second device;
   perform sentiment analysis for each respective user comment from among the plurality of user comments, wherein the sentiment analysis includes parsing text in the respective user comment and determining whether the respective user comment has a positive connotation or a negative connotation based on text analytics, wherein the text analytics comprises extracting, from the text of the respective user comment, subjective information that indicates an emotional state of an author of the respective user comment;
   identify an operational problem that occurs between the first device and the second device based on determining a negative connotation in the sentiment analysis;
   identify at least one probable cause associated with the operational problem; and
   provide (i) a notification of the operational problem and (ii) at least one suggested solution to the operational problem based on the at least one probable cause associated with the operational problem.

26. The computer readable medium of claim 25, wherein the suggested solution corrects the operational problem between the first device and the second device.

27. The computer readable medium of claim 25, wherein the second device is selected from the group consisting of a mobile device, smartphone, laptop, tablet, PC, wearable computer, appliance, and any other device capable of connecting to the first device.

28. The computer readable medium of claim 25, wherein the second device is connected to the first device based on a connection selected from the group consisting of: a wire, near field communications, Bluetooth, Bluetooth LE, infrared, and other wireless connection protocol.

29. The computer readable medium of claim 25, wherein the notification of the operational problem is provided to at least one selected from the group consisting of: a user, a first device manufacturer, and a second device manufacturer.

30. The computer readable medium of claim 25, wherein the operational problem is at least one selected from the group consisting of: an audio problem, a connection problem, a communication problem, a syncing problem, and a recognition problem.

31. The computer readable medium of claim 25, wherein the at least one probable cause is at least one selected from the group consisting of: a hardware issue and a software issue.

32. The computer readable medium of claim 25, wherein the suggested solution is at least one selected from the group consisting of: a hardware solution, a software solution, a first device setting solution, and a second device setting solution.

33. The computer readable medium of claim 25, wherein the at least one probable cause is a hardware issue and the at least one suggested solution is a software solution.

34. The computer readable medium of claim 25, wherein the online content includes one or more selected from the group consisting of: a website, a social media platform, a blog, a user review forum, and any other online content that can be searched for the plurality of user comments.

35. The computer readable medium of claim 25, wherein the plurality of instructions further cause the processor to deploy the suggested solution correcting the operational problem between the first device and the second device and determine that the operational problem has been corrected based on sentiment analysis of a plurality of additional user comments.

* * * * *